United States Patent [19]

Sahara et al.

[11] 4,027,200
[45] May 31, 1977

[54] HIGH VOLTAGE GENERATING CIRCUIT

[75] Inventors: Hiroshi Sahara, Tokyo; Tamiji Nagai, Kawasaki, both of Japan

[73] Assignee: Sony Corporation, Tokyo, Japan

[22] Filed: Oct. 16, 1975

[21] Appl. No.: 623,106

[30] Foreign Application Priority Data

Oct. 21, 1974 Japan ............... 49-127008[U]

[52] U.S. Cl. .................................. 315/411; 321/2
[51] Int. Cl.² ................................. H01J 29/70
[58] Field of Search ........... 321/2.8 R, 47; 315/408, 315/411; 178/DIG. 11; 336/105, 170; 323/48

[56] References Cited

UNITED STATES PATENTS

| | | | |
|---|---|---|---|
| 3,706,023 | 12/1972 | Yamada et al. | 321/2 |
| 3,813,574 | 5/1974 | Sato | 315/411 |
| 3,828,239 | 8/1974 | Nagai et al. | 321/2 |
| 3,868,538 | 2/1975 | Blanchard | 315/411 |
| 3,883,780 | 5/1975 | Tsukuda | 315/408 |
| 3,911,214 | 10/1975 | Mitsuda | 178/DIG. 11 |

Primary Examiner—William H. Beha, Jr.
Attorney, Agent, or Firm—Hill, Gross, Simpson, Van Santen, Steadman, Chiara & Simpson

[57] ABSTRACT

A high voltage generating circuit for a television receiver including a flyback transformer having primary and secondary windings which are loosely coupled to achieve substantial operational isolation therebetween. The secondary winding has a diode rectifying circuit coupled thereto for developing the high voltage signal which is applied to the anode of the television receiver. A tertiary winding is provided which is tightly coupled to the secondary winding and which has a capacitor in parallel therewith to form a resonant circuit which is resonant at a frequency somewhat higher than the horizontal sweep frequency applied to the deflection coil of the television receiver.

8 Claims, 5 Drawing Figures

HIGH VOLTAGE GENERATING CIRCUIT

BACKGROUND OF THE INVENTION

1. Field of the Invention

The field of art to which this invention pertains is high voltage generating circuits for color television receivers and in particular to circuits for producing good high voltage regulation under conditions of low load and high current load.

2. Description of the Prior Art

Prior art high voltage generating circuits for television receivers, have hitherto used so-called pulse rectifying systems in which the resonant frequency in a flyback transformer is selected to be higher than the horizontal sweep frequency of 15.75KHz, that is, for example, about 50KHz. This flyback transformer generated a high voltage pulse of the horizontal sweep period having a narrow pulse width, and this high voltage pulse was then peak-value-rectified by a diode rectifier circuit. Such a prior art pulse rectifying system has the drawback that when the high voltage load currnt increases, the high voltage is undesirably lowered since the angle of current flow of the diode in the rectifier circuit is quite small and hence the regulation is inferior.

Further, there has been considered a system wherein the high voltage pulse is converted into a sinusoidal voltage by using a resonant circuit which is tuned in the vicinity of the horizontal sweep frequency, and this sinusoidal voltage is rectified by a diode rectifier circuit to obtain the desired high voltage. According to the so-called sinusoidal rectifying system, to rectify the sinusoidal voltage, the angle of current flow of the diode in the rectifier circuit becomes wider than that of the pulse rectifying system, and the regulation of the high voltage is slightly improved. However, even in the sinusoidal rectifying system, there is the problem that when the high voltage load current is changed the resonant frequency of the resonant circuit will also be changed and hence the high voltage will be varied undesirably.

SUMMARY OF THE INVENTION

It is an important feature of the present invention to provide an improved high voltage generating circuit for a color television receiver which utilizes a flyback transformer having the primary and secondary windings thereof loosely coupled for isolation and having a resonant circuit provided in conjunction with the secondary of the flyback transformer to produce good voltage regulation.

It is a principal object of the present invention to provide a high voltage generating circuit for the anode of a color television receiver which utilizes a loosely coupled flyback transformer having a coupling coefficient in the range between 0.5 and 0.9 and having a resonant circuit in the secondary of the flyback transformer which has a resonant frequency in the vicinity of but higher than the horizontal sweep frequency of the television receiver.

It is also an object of the present invention to provide a flyback transformer in a high voltage generating circuit as described above wherein the transformer is produced on a split magnetic core having the primary and secondary windings of the flyback transformer disposed at opposite legs of the core to produce the desired loose coupling.

It is another object of the present invention to provide a tertiary winding for the flyback transformer in the high voltage generating circuit as described above where the tertiary winding is coupled to a capacitor to provide a resonant circuit and tightly coupled to the secondary winding thereof.

These and other objects, features and advantages of the present invention will be understood in greater detail from the following description and the associated drawings wherein reference numerals are utilized to designate an illustrative embodiment.

DESCRIPTION OF THE PREFERRED EMBODIMENT

The present device relates to a high voltage generating circuit for use in a television receiver and the like, and particularly is directed to a device which improves high voltage regulation.

Figure 1:
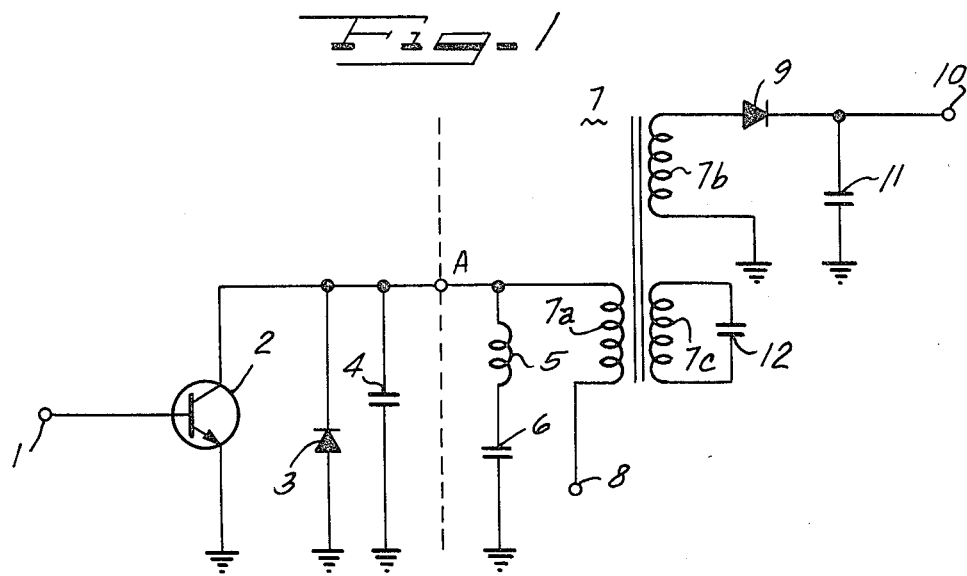
FIG. 1 is a schematic of one embodiment of the present invention showing the use of a loosely coupled flyback transformer with secondary and tertiary windings tightly coupled.

In FIG. 1, reference numeral 1 designates a horizontal signal input terminal to which a horizontal driving signal is applied. The horizontal signal input terminal 1 is connected to the base electrode of a npn-type transistor 2 forming a switching element, and the emitter electrode of the transistor 2 is grounded. The collector electrode of the transistor 2 is grounded through a damper diode 3 and also grounded through a resonant capacitor 4. Further, the collector electrode of the transistor 2 is grounded through a series circuit consisting of a horizontal deflection coil 5 and a DC block capacitor 6. It is also connected through a primary winding 7a of a flyback transformer 7 to a power supply terminal 8 to which a positive DC voltage is supplied. In this case, the primary side of the flyback transformer 7 is selected to have a resonant frequency relatively higher than the horizontal frequency of 15.75KHz, that is, for example, about 50KHz so that a pulse having a width corresponding to the horizontal blanking period in a video signal may be generated and also a sawtooth current of normal horizontal period may flow through the horizontal deflection coil 5.

The resonant frequency is mainly determined by the inductances of horizontal deflection coil 5 and primary winding 7a, respectively, and the capacitance of capacitor 4. One end of a secondary winding 7b of the flyback transformer 7 is grounded, while the other end thereof is connected through a diode 9 forming a high voltage rectifier circuit to a high voltage terminal 10 for supplying a high voltage to the anode of a cathode ray tube. The connection point between the diode 9 and the high voltage terminal 10 is grounded through a capacitor 11. The capacitor 11 is constructed by conductive films which are respectively deposited on the inner and outer walls of the cathode ray tube. In addition, the flyback transformer 7 is provided with a tertiary winding 7c across which a capacitor 12 is connected to form a resonant circuit. In this case, the resonant frequency of this resonant circuit is selected to be in the vicinity of the horizontal frequency $f_H$, for example, 15.75KHz, and the waveform of a voltage obtained across the secondary winding 7b of the flyback transformer 7 is substantially sinusoidal.

Figure 2:
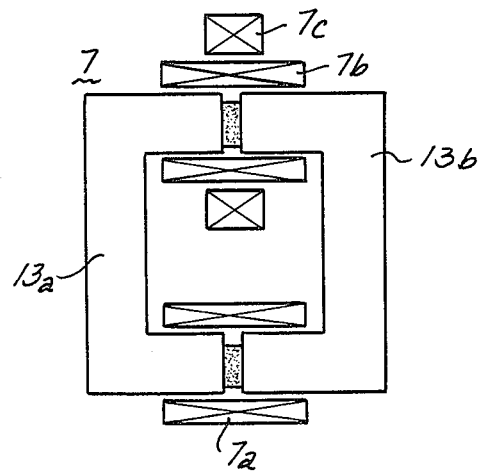
FIG. 2 is a structural view of one example of a flyback transformer which may be used in the circuit of FIG. 1 illustrating loose coupling between the primary and secondary windings and tight coupling between the secondary and tertiary windings.
Figure 3:
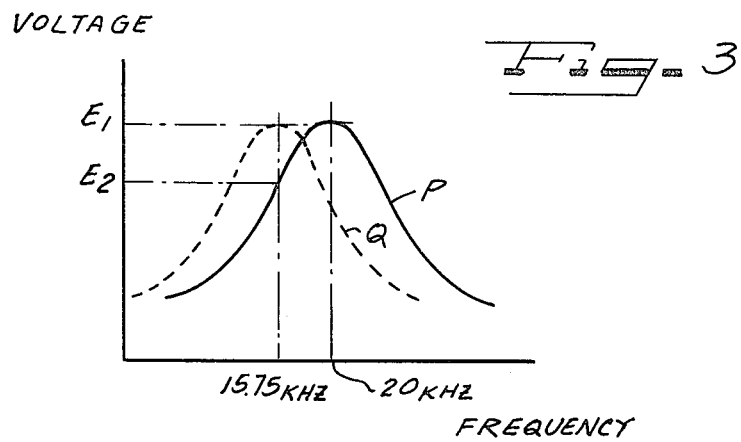
FIGS. 3 and 4 are graphs used for explaining the device of FIG. 1.

In the present device, the flyback transformer 7 is constructed in such a manner that as shown in FIG. 2, two U-shaped cores 13a and 13b are combined to form a square configuration, the primary winding 7a and the secondary winding 7b are respectively wound about the end portions of the U-shaped cores 13a and 13b, which are respectively opposed to each other, with the electromagnetic coupling coefficient, K, between the primary and secondary windings 7a and 7b being made relatively loose (0.5 < K < 0.9), and the tertiary winding 7c is wound about the same axis as that of the secondary winding 7b with the electromagnetic coupling between the secondary and tertiary windings 7b and 7c being made relatively close (K > 0.9). In FIG. 1, the inductance values of the primary, secondary and tertiary windings 7a, 7b and 7c of the flyback transformer 7, the inductance value of the horizontal deflection coil 5, the capacitance value of the capacitor 12, and the values of the electromagnetic coupling coefficients K of the primary, secondary and tertiary windings 7a, 7b and 7c of the flyback transformer 7 are respectively selected so that the resonant frequency of the system looking into the flyback transformer 7 from a point A, when the transistor 2, the diode 3 and the capacitor 4 are detached from the flyback transformer 7, may be a little higher than the horizontal frequency $f_H$, which is 15.75 KHz, that is, for example, 20 KHz, as shown in a curve P of FIG. 3.

Figure 4:
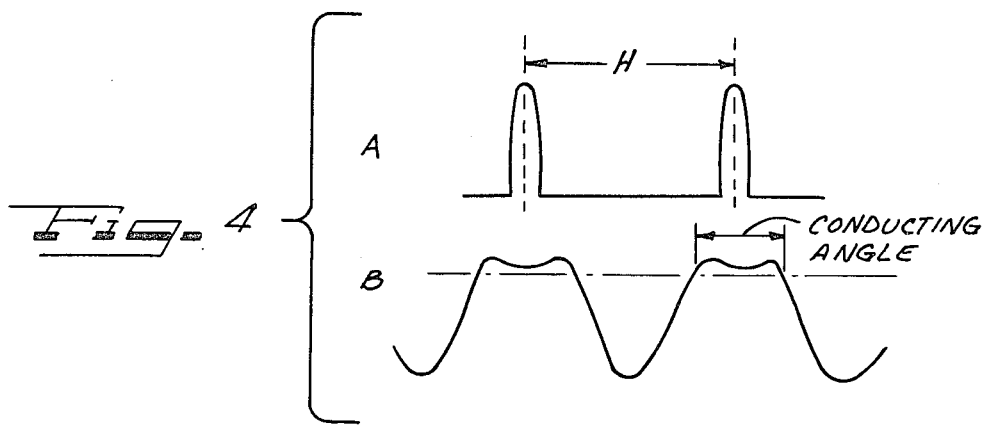

Since the high voltage generating circuit of this device is constructed as described above, a pulse signal of horizontal period H as shown in FIG. 4A is obtained at the primary side of the flyback transformer 7. Further, since the resonant frequency looking into the flyback transformer 7 from the point A is selected to be in the vicinity of the horizontal frequency $f_H$, that is, for example, 20 KHz, the flyback transformer 7 produces across the secondary winding 7b thereof a signal whose waveform is substantially sinusoidal but having its peak portion flattened as shown in FIG. 4B. Accordingly, the angle of current flow of the rectifier circuit consisting of the diode 9 is widened, and the regulation of the high voltage derived from the output terminal 10 is improved. In this case, when there is no high voltage load current, the capacitor 11 is charged to the peak value of the waveform shown in FIG. 4B, so that no current flows through the diode 9 and the diode 9 becomes nonconductive. At this time, the capacitor 11 is effectively disconnected from the flyback transformer 7 and hence the capacitance value of the capacitor 11 does not affect the resonant frequency of the flyback transformer 7.

When a high voltage load current does flow the electric charge stored in the capacitor 11 flows to the cathode ray tube, so that the voltage across the capacitor 11 is decreased. In order to compensate for the above voltage drop, a voltage produced at the secondary winding 7b of the flyback transformer 7 is fed through the diode 9 to the capacitor 11 and hence a current flows through the diode 9 to make it conductive. Thus, when the diode 9 becomes conductive, the capacitor 11 is effectively connected to the secondary winding 7b of the flyback transformer 7, and the resonant frequency of the flyback transformer system, that is, the central frequency of the resonant frequency characteristic is moved toward the horizontal frequency $f_H$, for example, 15.75 KHz, as shown in a curve θ of FIG. 3 with the result that the output, that is, the voltage produced across the secondary winding 7b will be increased. As a result, it is possible to compensate for reductions in high voltage caused by increases in high voltage load current.

Since the resonant frequency of the flyback transformer system looking from the side of the primary winding 7a of the flyback transformer 7 is selected higher than the horizontal frequency and since the capacitor 11 is effectively connected to the resonant circuit of the flyback transformer system in the presence of high voltage load current, the resonant frequency is lowered to increase the voltage produced at the secondary winding 7b of the flyback transformer 7. Further according to the present device, the resonant circuit consisting of the tertiary winding 7c and the capacitor 12 affects the voltage produced at the secondary winding 7b of the flyback transformer 7 to change its waveform to be substantially sinusoidal with its peak portion being flattened as shown in FIG. 4B. As a result, the angle of current flow of the diode 9 forming the high voltage rectifier circuit is widened and the reduction of the high voltage caused by increases of load current can be compensated. Thus, the present device improves high voltage regulation.

Figure 5:
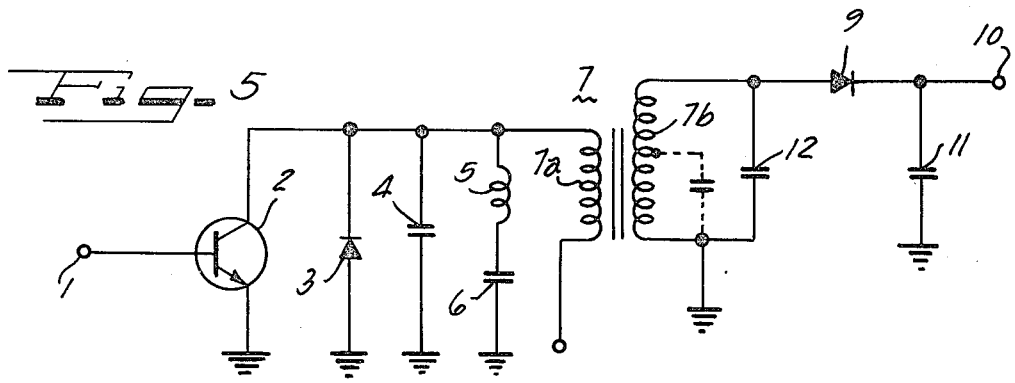
FIG. 5 is a schematic of an additional embodiment of the present invention which eliminates the use of a tertiary winding.

FIG. 5 shows another embodiment of the high voltage generating circuit of the present device. In FIG. 5, elements corresponding to those in FIG. 1 will be shown by the same reference numerals with their description omitted. In this example, the flyback transformer 7 is not provided with the tertiary winding 7c as shown in FIG. 1. The capacitor 12 is connected across the secondary winding 7b, and the electromagnetic coupling coefficient, K, between the primary and secondary windings 7a and 7b of the flyback transformer 7 is made relatively loose (0.5 < K < 0.9). In addition, the resonant frequency of the system looking into the flyback transformer from the point A is selected to be a little higher than the horizontal frequency $f_H$ or 15.75 KHz, that is, for example, 20 KHz. The other portions thereof are formed similar to the example in FIG. 1. It will be easily understood that the embodiment shown in FIG. 5 has the same working effect as that in FIG. 1. The example of FIG. 5 has the advantage of not requiring the tertiary winding 7c. However, the capacitor 12 must be a high voltage capacitor.

Further, in the embodiment of FIG. 5, it will also be noticed that the secondary winding 7b of the flyback transformer 7 may be provided with an intermediate tap, and the capacitor 12 may be connected between this intermediate tap and one end of the secondary winding 7b or the other end thereof as shown in dash lines with the same working effect as described above.

It will be apparent to those skilled in the art that many modifications and variations may be effected without departing from the spirit and scope of the novel concepts of the present invention.

We claim as our invention:
1. A high voltage generating circuit comprising:
   a horizontal oscillator developing an output signal at the horizontal sweep frequency;

a flyback transformer;

means for coupling the horizontal oscillator output to the primary of said flyback transformer;

the primary and secondary windings of said flyback transformer being coupled loosely to provide substantial isolation therebetween;

circuit means causing the input resonant frequency of said flyback transformer to be in the vicinity of and higher than the frequency of said horizontal oscillator;

the secondary winding of said flyback transformer developing a substantially sinusoidal voltage having its peak portion flattened; and means associated with said secondary winding for rectifying said sinusoidal voltage to produce a regulated high voltage DC signal thereof.

2. A high voltage generating circuit in accordance with claim 1, wherein the coupling coefficient between said primary and secondary windings is selected from the range of 0.5 to 0.9.

3. A high voltage generating circuit in accordance with claim 1, wherein said flyback transformer has a tertiary winding and wherein said circuit means comprises a capacitor connected across said tertiary winding for forming a resonant circuit, said secondary and tertiary windings being tightly coupled.

4. A high voltage generating circuit in accordance with claim 3, wherein the coupling coefficient between said secondary and tertiary windings is selected in the range of 0.9 to 1.0.

5. A high voltage generating circuit in accordance with claim 1, wherein a horizontal deflection coil is coupled to said horizontal oscillator.

6. A high voltage generating circuit in accordance with claim 5, wherein a further capacitor is coupled in parallel with said deflection coil.

7. A high voltage generating circuit in accordance with claim 1, wherein said flyback transformer has a split magnetic core, said split core being in the magnetic path between said primary and secondary windings, and a tertiary winding being wound directly in proximity with said secondary winding.

8. A high voltage generating circuit in accordance with claim 7, wherein said magnetic core is a rectangular core with said primary and secondary windings on opposite legs thereof and with said tertiary winding superimposed together with said secondary winding.

* * * * *